Patented Aug. 9, 1927.

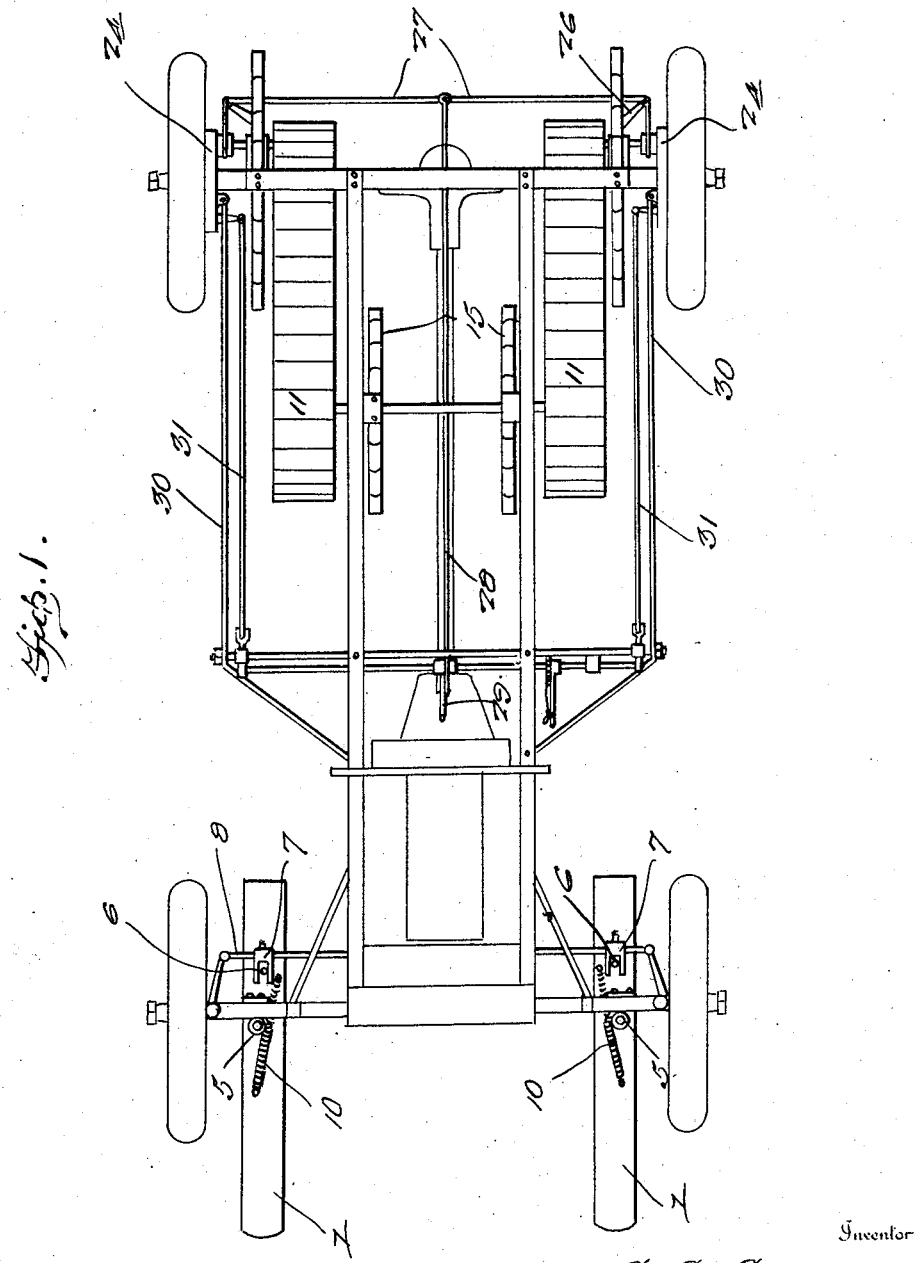

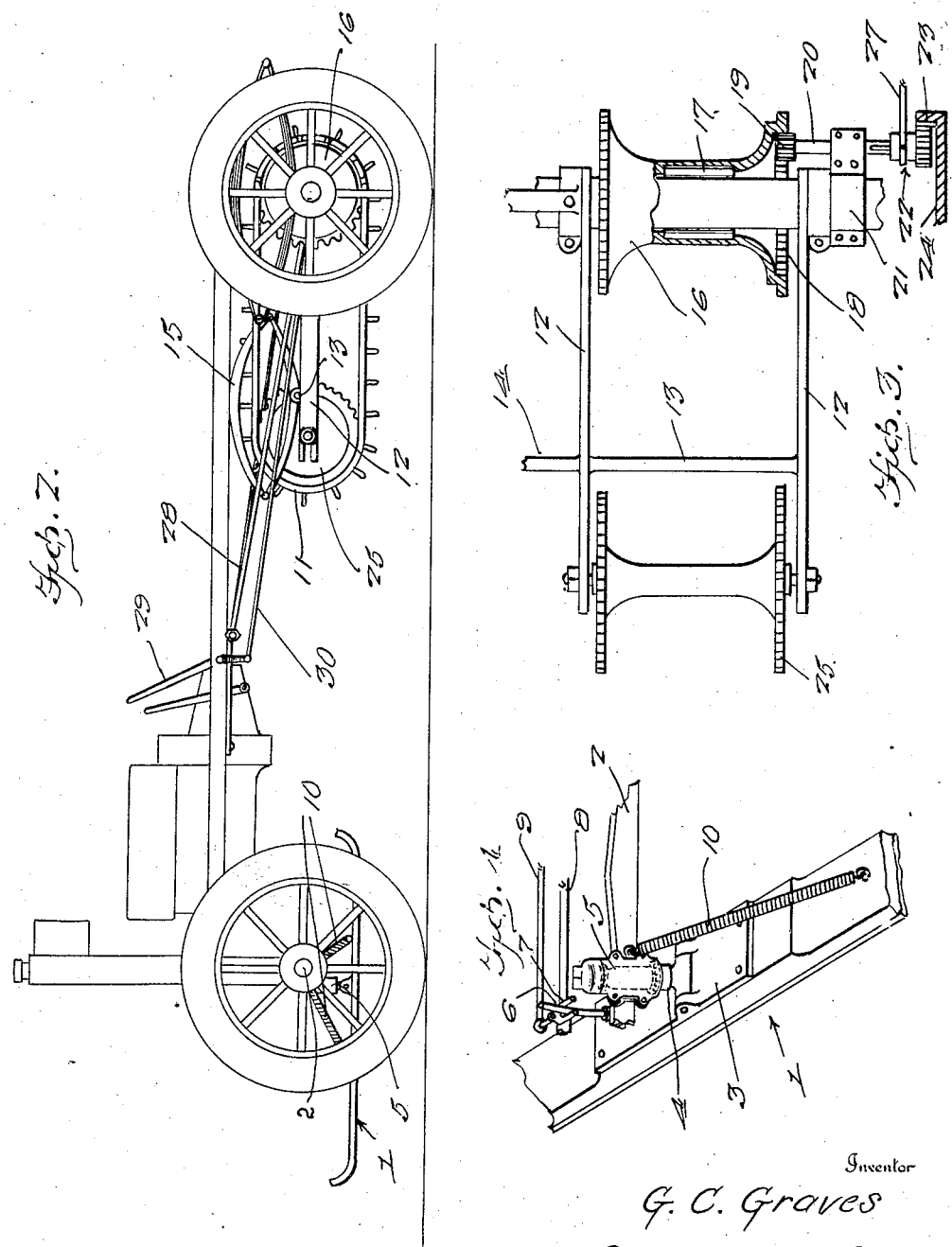

1,638,195

UNITED STATES PATENT OFFICE.

GEORGE C. GRAVES, OF ROCKFORD, MICHIGAN.

AUTOMOBILE SLED ATTACHMENT.

Application filed June 11, 1925. Serial No. 36,473.

This invention relates to a sled attachment for automobiles and the like, and it has reference to a device of this kind which embodies a pair of runners which are fastened to the front end of the automobile together with a pair of traction belts fastened to the rear end, the belts and runners being on a plane above the bottoms of the usual wheels so that when the automobile is driven through deep snow and the wheels are unable to function, the sled will come into play, support the body, and carry the automobile through the snow.

One feature of the invention is the novel means employed whereby the existing steering mechanism of the automobile may be utilized to advantage for steering the runners at the front of the automobile.

Another feature is the yieldable means employed for supporting the rear pair of traction belts, together with practical transmission gearing whereby power may be derived from the rear drive wheels of the automobile for operating the traction belts. Other features and advantages of the invention will become apparent during the course of the following description taken in connection with the accompanying drawings.

In the accompanying drawings forming a part of this application and in which like numerals designate like parts throughout the same:

Figure 1 is a top plan view of a conventional form of automobile showing the same equipped with a sled attachment constructed in accordance with the present invention.

Figure 2 is a side elevation of Figure 1.

Figure 3 is a fragmentary elevational and sectional view showing the operating means for one of the traction belts.

Figure 4 is a detail perspective view of the forward portion of one of the front runners showing the manner of mounting and steering the same.

In carrying out the invention I employ, as before stated, a pair of duplicate runners 1 at the front of the automobile. These are hung from the front axle 2 (see Figure 4). Also, as shown in this figure, a plate 3 is rigidly fastened to the central portion of the runner and a spindle 4 is pivotally connected with this plate and extends upwardly and is rotatably received in a sectional housing 5 permanently fastened to the front axle as shown. Also rising from the plate 3 is a rigid finger 6 which is received between the tines of a fork 7, this fork being rigidly fastened to the transversely shiftable rod 8 of the usual steering mechanism at the front. The rod 9 is simply that rod which transmits motion to the rod 8 from the steering wheel. By preference, two coil springs 10 are employed, one at the front and one at the rear of the axle for maintaining the runner in a substantially horizontal or level position.

The aforesaid traction belts are represented by the reference characters 11. Each traction belt and its complemental parts is supported from a pair of spaced forwardly extending arms 12 clamped or otherwise fastened upon the rear axle housing. There is a brace 13 between these arms, and a connecting rod 14 between the inner arms of the two pairs of arms at opposite sides of the chassis frame. Appropriate leaf springs 15 are connected to this shaft 14 and with the chassis bars of the automobile frame in any appropriate manner. Referring now to Figure 3, it will be seen that there is a sprocket 16 journaled upon the rear axle housing and equipped with anti-friction roller bearings 17. At its outer end this sprocket is open and formed with an internal gear 18 with which a pinion 19 is in mesh, the pinion being carried by a short rotatably mounted stub shaft 20. It is desirable to provide a bearing clamp 21 for this stub shaft. Also mounted on this stub shaft is a shiftable cog wheel 22, the cogs of which are adapted to mesh with the teeth on a ring gear 23 carried by the plate 24. This plate is fastened to the adjacent rear drive wheel. It is of such construction that it surrounds and does not interfere with the operation of the usual brakes. Adjustably and rotatably supported in the forward ends of the arms 12 is the complemental sprocket 25. The traction belts are of appropriate design and are trained over the sprockets in a conventional manner. Appropriately supported adjacent each driving gear 23 is a relatively stationary bracket arm 26 upon which a bell crank 27 is pivotally mounted.

It should be noticed that the short arms of the bell cranks are connected with the sliding cogs 22 while the long arms are pivotally connected at their inner adjacent ends with a longitudinal operating rod 28, this rod being in turn actuated by an appropriate lever 29 disposed within convenient reach of the driver's seat. The outside rods 30 are simply the radius rods provided and the rods 31 are those which are employed for operating the rear wheel brakes.

From the foregoing description it is obvious that I have produced an attachment for a conventional form of motor vehicle wherein when deep snow is encountered, the runners and traction belts will come into play in affording a means for supporting the entire weight of the vehicle and at the same time driving it forward over the snow upon proper manipulation of the manually controlled means for bringing the supplemental operating means of the sled into play. A clear understanding of the invention will no doubt be had and a more detailed description is therefore thought to be unnecessary.

Minor changes coming within the field of invention may be resorted to, if desired.

Having thus described the invention, what I claim as new and desire to secure by Letters Patent is:—

An auxiliary and booster drive means for use in connection with an ordinary drive wheel of an automobile, said means comprising an attachment adapted to propel a sled attachment and including a pair of spaced parallel arms provided at their rear ends with clamps adapted to be mounted upon the rear wheel axle housing, front and rear sprockets mounted for rotation between said arms, said rear sprockets being hollow and open at its outer end and provided at said outer end with an internal gear, an endless traction belt trained over said sprockets, a bearing adapted to be supported on said rear axle housing adjacent said internal gear, a shaft journaled for rotation in the bearing, a pinion on the inner end of the shaft in mesh with the teeth of said internal gear, a shiftable cog carried by the outer end portion of this shaft, a ring gear with which said shaft is adapted to cooperate, said ring gear being adapted for mounting on said drive wheel and operating means for shifting said cog on said shaft.

In testimony whereof I affix my signature.

GEORGE C. GRAVES.